US009802859B2

(12) United States Patent
Hori et al.

(10) Patent No.: US 9,802,859 B2
(45) Date of Patent: Oct. 31, 2017

(54) GLASS SHEET ON WHICH IS FORMED COATING SUITABLE FOR PREVENTING WEATHERING AND METHOD FOR PRODUCING SAME

(71) Applicant: Nippon Sheet Glass Company, Limited, Tokyo (JP)

(72) Inventors: Masahiro Hori, Hyogo (JP); Shinya Okamoto, Osaka (JP); Yasuhiro Saito, Nara (JP); Kazutaka Kamitani, Hyogo (JP); Paul Arthur Holmes, Northwich (GB)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 210 days.

(21) Appl. No.: 14/385,660

(22) PCT Filed: Mar. 12, 2013

(86) PCT No.: PCT/JP2013/001623
§ 371 (c)(1),
(2) Date: Sep. 16, 2014

(87) PCT Pub. No.: WO2013/145595
PCT Pub. Date: Oct. 3, 2013

(65) Prior Publication Data
US 2015/0072157 A1    Mar. 12, 2015

(30) Foreign Application Priority Data

Mar. 27, 2012 (JP) .................................. 2012-070916

(51) Int. Cl.
*C03C 17/32* (2006.01)
*C03C 17/00* (2006.01)
*C03C 17/42* (2006.01)

(52) U.S. Cl.
CPC ............ *C03C 17/32* (2013.01); *C03C 17/009* (2013.01); *C03C 17/324* (2013.01); *C03C 17/42* (2013.01);
(Continued)

(58) Field of Classification Search
CPC ....... C03C 17/32; C03C 17/009; C03C 17/42; C03C 17/324; C03C 2217/78
See application file for complete search history.

(56) References Cited

U.S. PATENT DOCUMENTS 3,723,312 A * 3/1973 Hay, Jr. .................. B65D 85/48
206/454
4,331,576 A * 5/1982 Colon ...................... C09J 7/021
156/331.6

(Continued)

FOREIGN PATENT DOCUMENTS

CN        101514274 A     8/2009
DE        2119349 A1     11/1972

(Continued)

OTHER PUBLICATIONS

Database WPI Week 208971 2009 Thomson Scientific, London, GB; AN 2009-N36170 XP002753132, & CN 101 514 274 A (Liaoning 113 Group Chem Co Ltd) Aug. 26, 2009 (Aug. 26, 2009).

*Primary Examiner* — Kara Boyle
(74) *Attorney, Agent, or Firm* — Abel Law Group, LLP

(57) ABSTRACT

Provided is a method for forming a coating containing an organic acid in a glass sheet production line while controlling an increase in the haze ratio of the glass. The method of the present invention is a method for producing a coated glass sheet, the method including the steps of cutting a glass ribbon to form a plurality of glass sheets in a glass sheet production line; and applying a solution onto the glass ribbon or the plurality of glass sheets in the glass sheet production line, the solution containing an organic acid and (Continued)

at least one selected from a water-soluble polymer and a polyphosphoric acid salt. The water-soluble polymer is preferably a water-soluble high-molecular-weight polymer, and more preferably a water-soluble copolymer. A preferred water-soluble copolymer contains a vinylpyrrolidone unit.

18 Claims, 3 Drawing Sheets

(52) U.S. Cl.
CPC ... *C03C 2217/78* (2013.01); *Y10T 428/31649* (2015.04)

(56) References Cited

U.S. PATENT DOCUMENTS

| | | | |
|---|---|---|---|
| 5,026,597 A | 6/1991 | Franz et al. | |
| 5,580,819 A * | 12/1996 | Li | B32B 17/10018 427/162 |
| 5,744,243 A * | 4/1998 | Li | B32B 17/10018 428/447 |
| 5,962,565 A | 10/1999 | Pagano | |
| 6,139,970 A | 10/2000 | Pagano | |
| 6,479,141 B1 * | 11/2002 | Sanbayashi | B01J 35/002 106/436 |
| 6,686,050 B2 * | 2/2004 | Lingle | B32B 17/10009 428/428 |
| 7,108,889 B2 * | 9/2006 | Bohland | B32B 3/14 427/154 |
| 2003/0186065 A1 | 10/2003 | Hou et al. | |
| 2010/0009202 A1 * | 1/2010 | Holmes | B65G 49/069 428/427 |
| 2012/0028051 A1 | 2/2012 | Critchley et al. | |

FOREIGN PATENT DOCUMENTS

| | | | | |
|---|---|---|---|---|
| FR | 2543514 A1 | | 10/1984 | |
| GB | 1413031 A | | 11/1975 | |
| JP | 4976916 A | | 7/1974 | |
| JP | 2000-191802 | * | 7/2000 | ............... C08J 5/18 |
| JP | 2001033608 A | | 2/2001 | |
| JP | 2002088298 A | | 3/2002 | |
| JP | 2005298237 A | | 10/2005 | |
| JP | 2008272935 A | | 11/2008 | |
| JP | 2009514764 A | | 4/2009 | |
| WO | 9924255 A1 | | 5/1999 | |
| WO | 2010067121 A1 | | 6/2010 | |

* cited by examiner

GLASS SHEET ON WHICH IS FORMED COATING SUITABLE FOR PREVENTING WEATHERING AND METHOD FOR PRODUCING SAME

TECHNICAL FIELD

The present invention relates to a glass sheet (coated glass sheet) on which is formed a coating suitable for preventing surface alteration of the glass sheet which is called "weathering", and relates to a method suitable for mass production of the glass sheet.

BACKGROUND ART

Glass itself is a material less subject to alteration. However, it is known that the surfaces of glass sheets stored for a long period of time undergo alteration called "weathering". The weathering occurs due to the fact that adhesion of water contained in the environment to the glass surface causes gradual dissolution of the components of the glass and thereby leads to a change of the state of the glass surface. The components dissolved from the glass are alkali metal ions as typified by sodium ions. With the dissolution of the alkali metal ions, the pH of the water adhering to the glass surface increases and reaches an alkaline pH. The silicon-oxygen (Si—O) bonds forming the framework of the glass is susceptible to erosion by alkaline solutions. On the glass surface with advanced erosion, insoluble matters may precipitate and thereby cause the appearance of white tarnish called "dimming". The main one of the insoluble matters is sodium carbonate produced by reaction between carbon dioxide in the air and the dissolved sodium ions. In addition, the glass surface may look rainbow-colored because of the presence of an altered surface layer having a reduced refractive index due to the dissolution of sodium. This alteration is called "staining".

Patent Literature 1 proposes applying an organic acid to a glass surface in order to prevent weathering. Adipic acid, fumaric acid, etc. are mentioned as examples of the organic acid (left upper column of page 2 in Patent Literature 1). The organic acid inhibits the erosion of the glass surface caused by alkaline solutions and prevents the occurrence of weathering.

CITATION LIST

Patent Literature

Patent Literature 1: JP 49-76916 A

SUMMARY OF INVENTION

Technical Problem

In order to efficiently apply an organic acid onto a glass sheet, it is effective to apply a solution containing the organic acid to a surface of a glass ribbon in a glass sheet production line. However, the application of a solution containing an organic acid to the surface of a glass ribbon causes the surface of the glass ribbon to become white and cloudy, and thereby increases the haze ratio of the glass. When an organic acid is applied to the extent desired for inhibition of weathering, the increase in haze ratio amounts to much more than 10%. Therefore, the white cloudiness of the surface of the glass ribbon caused by the application of the organic acid makes it difficult to carry out in the glass sheet production line an optical automatic inspection or a visual inspection for detecting defects in the glass ribbon.

The organic acid can easily be removed from the surface of the glass sheet by washing the glass sheet with water before use. In some applications, however, glass sheets may be used without washing of their surfaces. The washing operation, which has been originally unnecessary, may be an additional operation unacceptable to the glass sheet users. Also, in order not to diminish the commercial value of glass sheets, it is desirable to reduce the degree of white cloudiness caused by application of an organic acid.

One object of the present invention is to provide a method for forming a coating containing an organic acid in a glass sheet production line while controlling an increase in the haze ratio of the glass. Another object of the present invention is to provide a glass sheet on which is formed a coating that contains an organic acid but in which the increase in haze ratio by the organic acid is controlled.

Solution to Problem

According to the study by the present inventors, the white cloudiness of glass caused by application of an organic acid is associated with the crystallization of the organic acid. It has been found that the crystallization of the organic acid can be inhibited by applying a water-soluble polymer and/or a polyphosphoric acid salt together with the organic acid.

The present invention provides a method for producing a coated glass sheet, including the steps of:

cutting a glass ribbon to form a plurality of glass sheets in a glass sheet production line; and applying a solution onto the glass ribbon or the plurality of glass sheets in the glass sheet production line, the solution containing an organic acid and at least one selected from a water-soluble polymer and a polyphosphoric acid salt.

In another aspect, the present invention provides a coated glass sheet including a glass sheet and a coating formed on the glass sheet, the coating containing an organic acid and at least one selected from a water-soluble polymer and a polyphosphoric acid salt.

Advantageous Effects of Invention

According to the present invention, it is possible to apply an organic acid to a glass sheet in a glass sheet production line while controlling increase in the haze ratio of the glass. Therefore, an optical automatic inspection or the like for detecting defects of the glass can be carried out without any problem in the glass sheet production line. In addition, according to the present invention, it is possible to provide a coated glass sheet having a coating that contains an organic acid but in which the increase in haze ratio by the organic acid is controlled.

DESCRIPTION OF EMBODIMENTS

Hereinafter, coated glass sheets according to embodiments of the present invention will be described with reference to the drawings.

Figure 1:
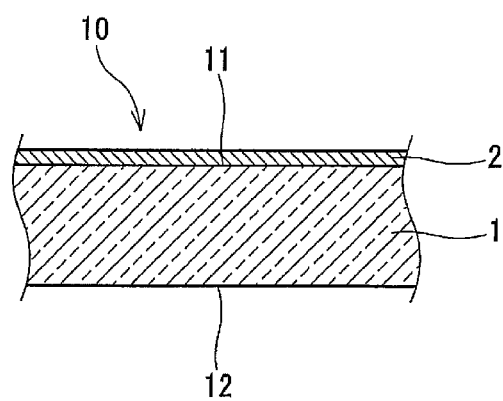
FIG. 1 is a cross-sectional view showing an embodiment of a coated glass sheet according to the present invention.

As shown in FIG. 1, a coated glass sheet 10 of the present embodiment has a glass sheet 1 and a coating 2 formed on a surface 11 of the glass sheet. The coating 2 contains an organic acid and a haze inhibitor for inhibiting the appearance of white cloudiness caused by crystallization of the organic acid. The haze inhibitor is a water-soluble polymer and/or a polyphosphoric acid salt. The coating 2 is soluble in water, and can be removed from the surface 11 by washing with water.

Any organic acid that shows a weathering prevention effect can be used without particular limitation. Preferred organic acids include carboxylic acids having two or more carboxyl groups such as dicarboxylic acids, tricarboxylic acids, and tetracarboxylic acids. Carboxylic acids having a hydroxyl group (hydroxycarboxylic acids) are also preferred organic acids. Specific examples of the preferred organic acids include adipic acid, itaconic acid, tartaric acid, malic acid, maleic acid, and lactic acid.

From the viewpoint of preservation of the working environment and the like, it is desirable that the solution used for forming the coating 2 be an aqueous solution. In addition, it is desirable that the coating 2 be easily removable by washing with water before use of the glass sheet 1. In view of these facts, it is preferable that components constituting the coating 2 be soluble in water.

However, when the coating 2 is too highly hygroscopic, an excessive amount of water may be absorbed from the environment into the coating 2 and become a potential factor of weathering. Therefore, it is desirable that the components constituting the coating 2 not be too highly hygroscopic. From this viewpoint, particularly preferred organic acids are adipic acid and itaconic acid.

It is preferable that the content of the organic acid in the coating 2 be 5 mg to 400 mg when calculated per 1 m² of the surface of the glass sheet 1. With an organic acid provided in an amount within the above range, it becomes easy to control the increase in haze ratio while preventing weathering. The more preferred amount of the organic acid applied is 10 mg/m² or more, and the particularly preferred amount of the organic acid applied is 20 mg/m² or more and 150 mg/m² or less.

As the water-soluble polymer, for example, at least one selected from polyvinylpyrrolidone, polyvinyl alcohol, polyethylene oxide, and water-soluble nylon can be used. Among these, polyvinylpyrrolidone has high solubility in water, and is also excellent in the function of inhibiting crystallization of the organic acid.

It is preferable that the water-soluble polymer be a water-soluble high-molecular-weight polymer. In the present description, the term "high-molecular-weight polymer" refers to a material having a molecular weight of 10,000 or more as commonly defined. The preferred molecular weight of the water-soluble high-molecular-weight polymer is 25,000 or more, or even 30,000 or more, or particularly 50,000 or more, or more particularly 60,000 or more. The upper limit of the molecular weight of the water-soluble high-molecular-weight polymer is not particularly specified. The molecular weight is, for example, 10,000,000 or less, or particularly 5,000,000 or less. In the present description, the term "molecular weight" refers to a weight-average molecular weight.

A polymer formed from a single monomer (so-called a homopolymer) has molecules that are likely to be oriented in a uniform direction in the coating 2, and tends to increase, albeit slightly, the haze ratio of the coating 2. Generally, copolymers have lower crystallinity than homopolymers. Therefore, the water-soluble polymer is preferably a water-soluble copolymer, and is more preferably a water-soluble copolymer having such a molecular weight as mentioned above, specifically, a molecular weight of 25,000 or more, or even 30,000 or more, or particularly 50,000 or more, or more particularly 60,000 or more.

Polyvinylpyrrolidone is an excellent haze inhibitor; however, polyvinylpyrrolidone has the possibility of being crystallized and, in some cases, cannot keep the haze ratio sufficiently low for a long period of time. A preferred water-soluble polymer is a water-soluble copolymer containing a unit derived from vinylpyrrolidone (vinylpyrrolidone unit; see the formula (1) shown below). This water-soluble copolymer is an excellent haze inhibitor that can keep the haze ratio low for a long period of time.

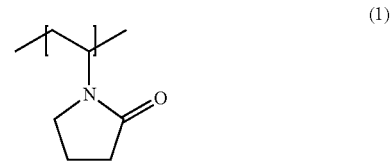

(1)

An example of a unit A that the water-soluble copolymer should have in addition to the unit represented by the formula (1) is a vinyl ester unit. Another preferred example of the unit A is a nitrogen-containing ring unit other than the vinylpyrrolidone unit. That is, it is preferable that the water-soluble copolymer further contain, in addition to the unit represented by the formula (1), at least one selected from a vinyl ester unit and a unit represented by the formula (2).

(2)

The nitrogen-containing ring in the formula (2) is a five-membered ring other than the nitrogen-containing ring shown in the formula (1), a six-membered ring, or a seven-membered ring. That nitrogen-containing ring preferably has a ring structure formed by bonding of ring-constituting atoms selected from a carbon atom, a nitrogen atom, and an oxygen atom, and the entire nitrogen-containing ring is preferably constituted by a carbon atom, a nitrogen atom, an oxygen atom, and a hydrogen atom.

It is preferable that the nitrogen-containing ring in the formula (2) contain a heteroatom other than the nitrogen atom bonded to the main chain of the polymer. A preferred nitrogen-containing ring contains, for example, a nitrogen atom and/or an oxygen atom as a ring-constituent atom other than the nitrogen atom bonded to the main chain, and contains, for example, a carbonyl group (—C(=O)—).

It is thought that the unshared electron pair contained in such a nitrogen-containing ring attracts a proton (H⁺) dissociated from the organic acid and thus inhibits the crystallization of the organic acid, similarly to the unshared electron pair of the carbonyl group of the unit represented by the formula (1). Examples of structures in the nitrogen-containing ring that are likely to provide such an effect include an amide bond ($R^1$—C(=O)$NR^2R^3$) and a bond represented by $R^1$—N=C—$NR^2R^3$. All of $R^1$ to $R^3$ are an organic residue.

Examples of the unit represented by the formula (2) include a unit represented by the formula (3) and a unit represented by the formula (4).

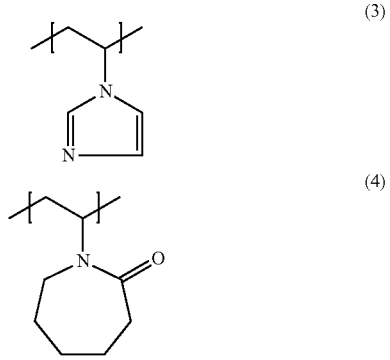

The unit represented by the formula (3) is a unit derived from vinylimidazole (vinylimidazole unit), and the unit represented by the formula (4) is a unit derived from vinyl ε-caprolactam (vinyl ε-caprolactam unit). These units contain a structure (described above) preferable for inhibition of crystallization of the organic acid.

It is preferable that the vinyl ester unit be a unit represented by the formula (5).

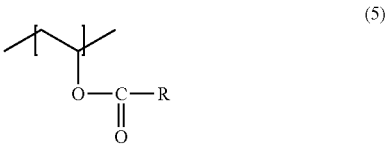

In this formula, R is a linear or branched alkyl group having 1 to 5 carbon atoms or preferably 1 to 3 carbon atoms.

The unshared electron pair contained in the vinyl ester unit is also thought to attract a proton disassociated from the organic acid and contribute to inhibition of the crystallization of the organic acid.

It is preferable that the units represented by the formula (1) be contained in the water-soluble copolymer in an amount of 20 mol % to 60 mol % or particularly 30 mol % to 50 mol % of all the structural units.

The polyphosphoric acid salt is a salt of an oxo acid containing a condensate of a plurality of tetrahedral phosphoric acid ($PO_4$) units, and is preferably a salt of pyrophosphoric acid (diphosphoric acid), a salt of tripolyphosphoric acid (triphosphoric acid), or a salt of tetrapolyphophoric acid (tetraphosphoric acid). The polyphosphoric acid salt is, for example, a salt of polyphosphoric acid and an alkali metal atom. Specific examples of the polyphosphoric acid salt include sodium tripolyphosphate, sodium pyrophosphate, and potassium pyrophosphate.

Similarly to the water-soluble polymer, the polyphosphoric acid salt is thought to inhibit crystallization of the organic acid by attracting a proton or the like dissociated from the organic acid.

The feature of the polyphosphoric acid salt resides in that it can have high water solubility than the water-soluble polymer. Therefore, the polyphosphoric acid salt is suitable for use for a surface having roughness. This is because when the coating 2 formed on a surface having roughness needs to be washed off, the components constituting the coating 2 are required to have higher water solubility.

Figure 2:
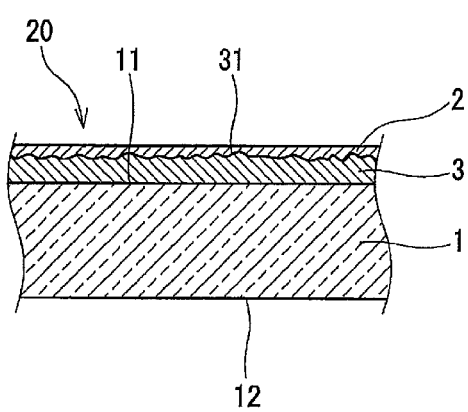
FIG. 2 is a cross-sectional view showing another embodiment of a coated glass sheet according to the present invention.

As shown in FIG. 2, there is a case where a thin film 3 is formed on the surface 11 of the glass sheet 1 in order to add a desired function to the glass sheet 1. In many such cases, minute roughness is formed purposely or appears inevitably on the surface 31 of the thin film 3. For example, on a surface of a conductive film formed as a transparent electrode of a solar cell, minute roughness is formed in order to scatter incident light and thereby increase incident photon-to-current conversion efficiency of the solar cell. This roughness is introduced, for example, by growing crystal grains of a tin oxide film. Also, minute roughness is formed in a surface of a light scattering film formed for anti-glare purpose or the like. This roughness is introduced, for example, by placing silicon oxide fine particles on a surface of a glass sheet. In addition to the above, in the case of various thin films used as ultraviolet blocking films, infrared blocking films, colored films, antireflection films and the like, roughness may be formed in the surfaces of the films inevitably or purposely in the production process.

Unlike the coating 2, the thin film 3 is required to exhibit properties such as electrical conductivity and light scattering property over the period of use of the glass sheet 1. Therefore, the thin film 3 usually contains an inorganic substance as a main component. The inorganic substance as the main component is, for example, an oxide such as silicon oxide, tin oxide, titanium oxide, or zinc oxide, a nitride such as silicon nitride, a carbide such as silicon carbide, a sulfide such as zinc sulfide, a fluoride such as calcium fluoride, or a metal such as silver or aluminum. Also in this case, the thin film 3 may contain as an auxiliary component an organic substance added as an ultraviolet absorber or the like.

By contrast, the coating 2 in the present embodiment contains the organic acid, the water-soluble polymer, and another organic substance as main components. Here, "contains an inorganic substance (organic substance) as a main component" means that the mass content of the component is higher than that of other components or, in other words, the content of the inorganic substance (organic substance) is higher than that of the organic substance (inorganic substance). In the present embodiment, the thin film 3 and the coating 2 can be distinguished from each other in that the thin film 3 is insoluble in water while the coating 2 is soluble in water.

Basically, in an embodiment in which the thin film 3 covers the surface 11 of the glass sheet 1, weathering does not proceed in the surface 11. In many cases, however, the thin film 3 is formed only on one surface 11 as in the coated glass sheet 20 shown in FIG. 2. In this case, it is necessary to inhibit weathering in a reverse surface 12 that is uncovered. Although the coating 2 can be formed directly on the reverse surface 12, it is often difficult to form a film on the reverse surface 12 in the glass sheet production line.

Glass sheets are usually stored in the form of a stack. It thus follows that the reverse surface 12 of each glass sheet faces the thin film 3 formed on the surface 11 of the adjacent glass sheet. Therefore, the coating 2 formed on the surface 31 of the thin film 3 acts on the reverse surface 12 of the adjacent glass sheet, and serves to inhibit the progress of weathering in the reverse surface 12.

In the case where the organic acid is applied onto the thin film 3, the content of the organic acid in the coating 2 may be smaller than in the case where the coating 2 is formed directly on the surface of the glass sheet. It is preferable that the coating 2 formed on the thin film 3 contain the organic acid in an amount of 5 mg to 100 mg when the amount is calculated per 1 m² of the glass surface, and particularly contain the organic acid in an amount of 10 mg/m² to 70 mg/m².

The coating 2 of the coated glass sheet 10 comes into contact with that reverse surface 12 of the adjacent glass sheet on which the thin film 3 is not formed, thus inhibiting the progress of weathering. Assuming that the glass sheets are stored by being stacked in such a manner that their surfaces 11 face in the same direction, then it is sufficient for the coating 2 to be formed so as to cover one surface of the glass sheet 1. One preferred embodiment of the present invention is a glass sheet stack composed of a plurality of glass sheets 1 stacked in such a manner that the coating 2 of each glass sheet is located between the surface 11 of the glass sheet and the surface 12 of the adjacent glass sheet.

As described with reference to FIG. 1 and FIG. 2, the coated glass sheet of the present embodiment may have the coating 2 formed directly on the surface 11 of the glass sheet 1. Alternatively, the coated glass sheet may further have the thin film 3 formed on the surface 11 of the glass sheet 1 and containing an inorganic substance as a main component, and the coating 2 may be formed on the surface 31 of the film 3. In the case where the surface 31 of the thin film 3 formed on the glass sheet 1 has roughness and the coating 2 is to be formed on the surface 31, it is preferable to use a polyphosphoric acid salt as a haze inhibitor. On the other hand, in the case where the coating 2 is to be formed directly on the surface 11 of the glass sheet 1, it is preferable to use a water-soluble polymer or particularly a water-soluble copolymer as a haze inhibitor. This is because, basically, polyphosphoric acid salts are mildly alkaline. In the case where a polyphosphoric acid salt is applied to the uncovered glass surface, it is desirable to adjust the components of the coating solution so that the solution is acidic and preferably has a pH of 4 or less.

It is preferable that, in the coating 2, the haze inhibitor that is a water-soluble polymer and/or a polyphosphoric acid salt be contained in an amount of 20 mg to 250 mg or particularly 30 mg to 200 mg when the amount is calculated per 1 m² of the glass surface. With the haze inhibitor provided on the glass surface in an amount within the above range, it becomes easy to control the increase in haze ratio. The particularly preferred amount of the inhibitor applied is 35 mg/m² or more and 150 mg/m² or less.

It is preferable to adjust the amount of the haze inhibitor depending on the amount of the organic acid. Specifically, it is effective to perform the adjustment so that the total number of functional groups of the haze inhibitor falls within a predetermined range relative to the total number of functional groups of the organic acid. The total number of the functional groups of the organic acid can be determined by multiplying the number of acid groups (which is 2 per mole in the case of a dicarboxylic acid) by the number of moles. When the haze inhibitor is a water-soluble polymer, the total number of the functional groups of the haze inhibitor can be determined based on the total number of atoms having an unshared electron pair capable of attracting a proton. When the haze inhibitor is a polyphosphoric acid salt, the total number of the functional groups of the haze inhibitor can be determined based on the valence of an anion generated by salt dissociation. For example, the number of functional groups in the unit represented by the formula (1), (3), or (5) is counted as 1. For example, the number of functional groups in sodium tripolyphosphate ($Na_5P_3O_{10}$) is 5 per mole.

A preferred ratio (functional group ratio) of the total number of the functional groups of the haze inhibitor to the total number of the functional groups of the organic acid is, for example, 0.3 to 3, or even 0.4 to 2.5, or particularly 0.5 to 2.3, or more particularly 0.8 to 1.5. The reason why the inhibition effect on crystallization of the organic acid is obtained even with this ratio being less than 1 is that the degree of dissociation of the organic acid is low.

Employing the present embodiment not only allows control of increase in the haze ratio of glass caused by application of an organic acid in a glass sheet production line, but also makes it possible that increase in the haze ratio of a coated glass sheet produced will be controlled during a storage period.

The haze ratio of the coated glass sheet in the present embodiment is preferably less than 8%. In the case where the coating 2 is formed directly on a surface of the glass sheet 1, the haze ratio of the coated glass sheet 10 is preferably 5% or less, more preferably 3% or less, and particularly preferably 2% or less. In the case of the embodiment in which the thin film 3 is formed, the haze ratio of the coated glass sheet 20 may greatly increase (to 8% or more, for example) due to the presence of the thin film 3. Therefore, when the embodiment including the thin film 3 and having a high haze ratio should be taken into account, it is more appropriate to specify the haze ratio of the coated glass sheet 10 (20) by the difference between the haze ratios in the presence and absence of the coating 2. The haze ratio of the coated glass sheet 10 (20) differs by less than 8%, preferably by 5% or less, more preferably by 3% or less, or particularly preferably by 2% or less from a haze ratio measured with only the coating 2 removed (haze ratio of the other portion of the coated glass sheet 10 (20) than the coating 2).

Next, an embodiment of the production method according to the present invention will be described with reference to FIG. 3.

Figure 3:
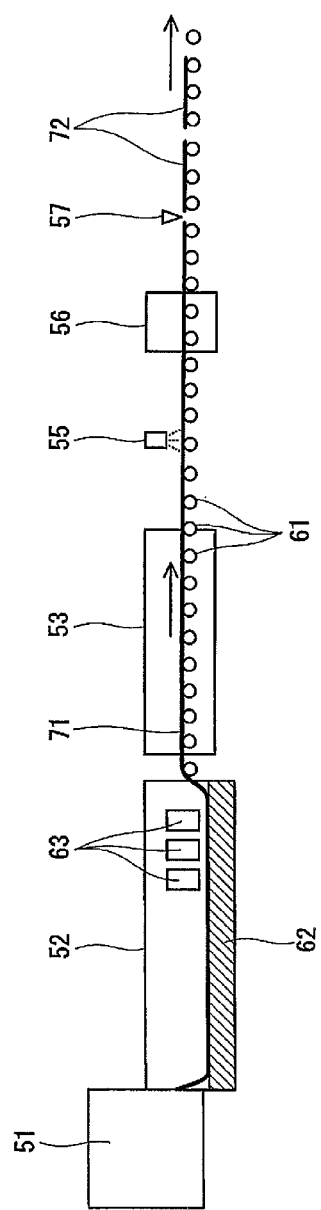
FIG. 3 is a schematic diagram showing an example of a glass sheet production line for carrying out a production method according to the present invention.

FIG. 3 is a schematic diagram of a glass sheet production line employing a float process. Molten glass resulting from melting of a glass raw material put into a melting furnace 51 is formed into a sheet-shaped glass ribbon 71 on a molten tin 62 in a float bath 52. The glass ribbon 71 is drawn out of the float bath 52 into an annealing furnace 53, and is gradually cooled while being conveyed by rollers 61 in the annealing furnace 53. The glass ribbon 71 taken out of the annealing furnace 53 is subjected to defect inspection using an optical detector 56, and is then divided into glass sheets 72 by a cutting device 57. The plurality of separate glass sheets 72 are conveyed downstream further in the production line, are taken out of the production line and then loaded onto a pallet by a glass sheet-handling device which is not shown in the figure. On the pallet, the glass sheets 72 are sequentially stacked so that the bottom surface (the surface that is in contact with the tin in the float bath 52) of each glass sheet is in contact with the top surface (the surface that does not contact with the tin) of the adjacent glass sheet. In this state, the glass sheets are stored.

Although not shown in the figure, other devices are provided in the glass sheet production line as in conventional production lines. Examples of the devices which are not shown in the figure include: a device for cutting off the side edges of the glass ribbon 71; and a device for removing, from the production line, glass sheets having defects detected by the optical detector 56. The detailed structures of the above-described devices, which are not shown in the figure either, may be designed as conventional. For example, the cutting device 57 for the glass ribbon includes a cutter configured to form a mark (scribe line) as a cutting groove on the glass while moving laterally across the surface of the glass ribbon 71; and a dividing device located downstream of the cutter and configured to divide the glass ribbon 71 at the marked portions into the glass sheets 72 by lifting the glass ribbon 71 upward using a roller.

In the present embodiment, a solution containing an organic acid and a haze inhibitor is applied with an applicator 55 onto the glass ribbon 71 on the downstream side of the annealing furnace 53, so that the coating 2 is formed on the glass ribbon 71.

It is preferable to apply the solution to the glass surface having a temperature of 80° C. or less or particularly 60° C. or less. When the surface temperature of the glass is too high, the organic substance contained in the solution may be decomposed, or the coating may become uneven as a result of the solution being rapidly dried. In order to remove the solvent contained in the solution by vaporizing the solvent using residual heat of the glass, it is preferable to apply the solution to the glass having a surface temperature of 30° C. or more or particularly 50° C. or more. Taking into account the fact that the solution should be applied to the glass surface having a temperature within the above range, it is preferable to place the solution applicator 55, as shown in FIG. 3, in such a manner that the solution can be applied to the glass ribbon 71 that has been taken out of the annealing furnace 53 and that has yet to reach the optical detector 56.

In the present embodiment, since a water-soluble polymer and/or a polyphosphoric acid salt as the haze inhibitor is added to the solution together with the organic acid, the increase in haze ratio caused by crystallization of the organic acid is controlled. Therefore, it is possible to prevent problems from occurring in automatic detection performed by the optical detector 56 for defects in the glass ribbon 71. Examples of the defects to be detected by the optical detector 56 include air bubbles, foreign matters, and cords.

The solution can be applied to the glass ribbon 71 or the glass sheets 72 on the downstream side of the optical detector 56. The application of the solution on the downstream side of the optical detector 56 allows avoiding the situation where the increase in haze ratio caused by crystallization of the organic acid poses a problem in the detection of defects. Even in this case, however, if the coating 2 greatly increased the haze ratio, the commercial value of the glass sheets 72 would be greatly diminished depending on their use. Therefore, it is desirable that the haze ratio of the coating 2 be low. In the glass sheet production line, the temperature of the glass surface decreases toward the downstream side. Therefore, it is often the case that the solution applied to the glass in a section where the surface temperature is low needs to be dried using a dryer separately disposed. As the solution applicator 55, a commonly-known device configured to apply solutions by spray coating, curtain flow coating, roll coating or the like may be used.

In the glass sheet production line of the present embodiment, a plurality of coaters 63 are disposed within the float bath 52 in order to carry out a chemical vapor deposition method (CVD method). A raw material gas for forming the thin film 3 on the surface of the glass ribbon 71 is fed from the coaters 63, and the components contained in the raw material gas undergo reaction on the high-temperature surface, so that the thin film 3 is formed. Although a wide variety of types of the thin film 3 can be formed, a typical example of the thin film 3 is a transparent conductive film used, for example, as a transparent electrode of a solar cell. An example of the transparent conductive film is a tin oxide film doped with a trace element such as fluorine or antimony and thus having an improved conductivity. In some cases, an underlayer film is formed between the glass ribbon 71 and the transparent conductive film in order to, for example, prevent dissolution of the alkali component contained in the glass ribbon 71. That is, the thin film 3 is not limited to a single-layer film, and may be composed of a plurality of layers.

In the case where the thin film 3 is formed, the solution from the solution applicator 55 is applied to the surface of the thin film 3. The organic acid contained in the solution prevents weathering of that reverse surface 12 of the glass sheet 1 with which the organic acid is in contact when the plurality of glass sheets 72 are stacked on one another. In addition to this, the organic acid serves to make it easier to remove contaminants that are likely to adhere to the surface of the thin film 3.

It is preferable that the solvent of the solution be water. An aqueous solution is advantageous, for example, in terms of preservation of working environment and assurance of safety. The concentration of the organic acid in the solution is, for example, 0.1 g to 5 g, preferably 0.25 g to 4 g, more preferably 0.5 g to 2.5 g, and, in some cases, 1 g to 2.5 g, per 100 g of the solvent. In addition, the concentration of the haze inhibitor in the solution is, for example, 0.25 g to 5 g, preferably 0.5 g to 4 g, and more preferably 1 g to 2.5 g per 100 g of the solvent.

A component other than the organic acid and the water-soluble polymer may be added to the solution. An example of the component preferably added is a surfactant. When a surfactant is added, the wettability of the glass surface by the solution is improved, and a less uneven coating can be formed. Examples of components other than the surfactant which may be added include an antifungal agent and an antibacterial agent. The preferred amount of the surfactant to be added is 1 mg to 15 mg when calculated per 1 $m^2$ of the glass surface, and is 0.01 g to 0.2 g per 100 g of the solvent. Usually, it is sufficient to add a surfactant in an amount less than that of the haze inhibitor.

EXAMPLES

First, test methods employed for Examples and Comparative Examples given below will be described.

(Haze Ratio Change Measurement Test)

Each glass sheet to be measured was exposed to a hot and humid environment maintained at a temperature of 60° C. and a relative humidity of 80% for a predetermined number of days. The hot and humid environment was created using a small-size environment tester "SH221" manufactured by ESPEC Corporation. The glass sheet was placed flat in a stainless steel container, which was retained in the environment tester. In the case where the glass sheet was a coated glass sheet, the glass sheet was held in such a position that one surface of the glass sheet on which was formed a coating faced upward, while the reverse surface faced a surface of the container. After the predetermined number of days elapsed, the haze ratio of the glass sheet was measured using a haze meter "NDH 2000" manufactured by NIPPON DENSHOKU INDUSTRIES CO., LTD. The haze ratio was measured also immediately after the formation of the coating, and the measured value was defined as an initial value. In the cases where the glass sheets obtained in Examples and Comparative Examples had a size of larger than 100 mm square, the glass sheets were each cut into 100 mm square, and then subjected to the above test. For tests under the above conditions, it is confirmed that the haze ratio change caused by weathering of the glass of the reverse surface is negligible.

(Weathering Evaluation Test)

Each glass sheet to be measured was exposed to a hot and humid environment maintained at a temperature of 60° C. and a relative humidity of 100% for 20 days. The hot and humid environment was created using the above small-size environment tester. In the case where the glass sheet was a coated glass sheet, the glass sheet was held in such a position that one surface of the glass sheet on which was formed a coating faced upward, while the reverse surface faced a surface of the container. After the exposure, the state of weathering in the surface of the glass sheet was evaluated by visual observation. In the case of a coated glass sheet, the surface of the glass sheet was uncovered before the visual observation by removing the coating by washing with water.

Example 1

A 3-mm thick, 300-mm square float glass sheet was prepared. The haze ratio of the glass sheet was measured to be 0%. As a coating liquid, a solution was prepared by dissolving 0.5 g of adipic acid (special grade, manufactured by Sigma-Aldrich Co., LLC.), 0.5 g of a vinylpyrrolidone/vinyl acetate copolymer ("Luvitec VA64W" manufactured by BASF and having a weight-average molecular weight of 65,000), and 0.1 g of a nonionic surfactant (polyoxyalkylene alkyl ether "LA-775" manufactured by ADEKA CORPORATION) in 100 g of water. The vinylpyrrolidone/vinyl acetate copolymer contains the vinylpyrrolidone units (see the formula (1)) and the vinyl acetate units (see the formula (5); R=methyl group) at a molar ratio of 6:4.

Next, the coating liquid was applied to one surface of the glass sheet using a sponge roller, and the water as the solvent was removed by drying using a blower to form a coating on the surface of the glass sheet. The amount of the coating liquid applied was set so that the amounts of the adipic acid and the copolymer were each 50 mg per 1 m² of the glass surface.

Example 2

A coating was formed on a surface of a glass sheet in the same manner as in Example 1, except that the amounts of the adipic acid and the vinylpyrrolidone/vinyl acetate copolymer added to the coating liquid were each twice (1.0 g) those in Example 1.

Example 3

A coating was formed on a surface of a glass sheet in the same manner as in Example 1, except that a vinylpyrrolidone/vinylcaprolactam copolymer ("Luvitec VPC55K65W" manufacture by BASF and having a weight-average molecular weight of 900,000) was used instead of the vinylpyrrolidone/vinyl acetate copolymer. The vinylpyrrolidone/vinylcaprolactam copolymer contains the vinylpyrrolidone units (see the formula (1)) and the vinylcaprolactam units (see the formula (4)) at a molar ratio of 1:1.

Example 4

A coating was formed on a surface of a glass sheet in the same manner as in Example 1, except that a vinylpyrrolidone/vinylimidazole copolymer ("Luvitec VPI55K72W" manufactured by BASF and having a weight-average molecular weight of 1,200,000) was used instead of the vinylpyrrolidone/vinyl acetate copolymer. The vinylpyrrolidone/vinylimidazole copolymer contains the vinylpyrrolidone units (see the formula (1)) and the vinylimidazole units (see the formula (3)) at a molar ratio of 1:1.

Example 5

A coating was formed on a surface of a glass sheet in the same manner as in Example 1, except that the amount of the vinylpyrrolidone/vinyl acetate copolymer added to the coating liquid was twice (1.0 g) that in Example 1.

Example 6

A coating was formed on a surface of a glass sheet in the same manner as in Example 1, except that the amount of the vinylpyrrolidone/vinyl acetate copolymer added to the coating liquid was 0.7 times (0.35 g) that in Example 1.

Example 7

A coating was formed on a surface of a glass sheet in the same manner as in Example 1, except that polyvinylpyrrolidone ("Luvitec K60" manufactured by BASF and having a molecular weight of 450,000) was used instead of the vinylpyrrolidone/vinyl acetate copolymer.

Example 8

A coating was formed on a surface of a glass sheet in the same manner as in Example 1, except that polyvinylpyrrolidone ("Luvitec K90" manufactured by BASF and having a molecular weight of 1,400,000) was used instead of the vinylpyrrolidone/vinyl acetate copolymer.

Example 9

A coating was formed on a surface of a glass sheet in the same manner as in Example 1, except that polyethylene oxide ("Polyox WSR-N10" manufactured by Dowwolff and having a molecular weight of 100,000) was used instead of the vinylpyrrolidone/vinyl acetate copolymer.

Example 10

A coating was formed on a surface of a glass sheet in the same manner as in Example 1, except that itaconic acid (special grade, manufactured by Sigma-Aldrich Co., LLC.) was used instead of the adipic acid.

Example 11

A coating was formed on a surface of a glass sheet in the same manner as in Example 2, except that itaconic acid (special grade, manufactured by Sigma-Aldrich Co., LLC.) was used instead of the adipic acid.

Example 12

A coating was formed on a surface of a glass sheet in the same manner as in Example 1, except that tartaric acid (special grade, manufactured by Sigma-Aldrich Co., LLC.) was used instead of the adipic acid.

Comparative Example 1

A coating was formed on a surface of a glass sheet in the same manner as in Example 1, except that a coating liquid was prepared without addition of the vinylpyrrolidone/vinyl acetate copolymer.

Example 13

A 3-mm thick, 100-mm square float glass sheet on one surface of which was formed a tin oxide film was prepared. The haze ratio of the glass sheet was measured to be 8%. As a coating liquid, a solution was prepared by dissolving 0.5 g of adipic acid (special grade, manufactured by Sigma-Aldrich Co., LLC.), 0.5 g of sodium tripolyphosphate ("technical grade, 85%" manufactured by Sigma-Aldrich Co., LLC.), and 0.1 g of a nonionic surfactant (polyoxyalkylene alkyl ether "LA-775" manufactured by ADEKA CORPORATION) in 100 g of water.

Next, the coating liquid was applied to a surface of the tin oxide film using a sponge roller, and the water as the solvent was removed by drying using a blower to form a coating over the surface of the glass sheet. The amount of the coating liquid applied was set so that the amounts of the adipic acid and the sodium tripolyphosphate were each 30 mg per 1 m$^2$ of the glass surface.

Example 14

A coating was formed on a surface of a tin oxide film in the same manner as in Example 13, except that the amount of the sodium tripolyphosphate added to the coating liquid was two-thirds (0.33 g) of that in Example 13.

Example 15

A coating was formed on a surface of a tin oxide film in the same manner as in Example 13, except that the amount of the adipic acid added to the coating liquid was five-thirds (0.83 g) of that in Example 13.

Example 16

A coating was formed on a surface of a tin oxide film in the same manner as in Example 13, except that itaconic acid (special grade, manufactured by Sigma-Aldrich Co., LLC.) was used instead of the adipic acid.

Example 17

A coating was formed on a surface of a tin oxide film in the same manner as in Example 13, except that tartaric acid (special grade, manufactured by Sigma-Aldrich Co., LLC.) was used instead of the adipic acid.

Example 18

A coating was formed on a surface of a tin oxide film in the same manner as in Example 13, except that the vinylpyrrolidone/vinyl acetate copolymer used in Example 1 was used instead of the sodium tripolyphosphate.

Example 19

A coating was formed on a surface of a tin oxide film in the same manner as in Example 18, except that polyvinylpyrrolidone ("K-90 CP grade" manufactured by Sigma-Aldrich Co., LLC. and having a molecular weight of 1,200,000) was used instead of the vinylpyrrolidone/vinyl acetate copolymer.

Comparative Example 2

A coating was formed on a surface of a tin oxide film in the same manner as in Example 13, except that a coating liquid was prepared without addition of the sodium tripolyphosphate.

Comparative Example 3

A coating was formed on a surface of a tin oxide film in the same manner as in Comparative Example 2, except that the amount of the adipic acid added to the coating liquid was five-thirds (0.83 g) of that in Comparative Example 2.

The measurement results of Examples and Comparative Examples are shown in Table 1 and Table 2 together with the types and amounts of the organic substances applied. In Table 1 and Table 2 are also shown the results of tests carried out for a glass sheet that had no films and whose both surfaces were uncovered (blank 1) and a glass sheet on which only a tin oxide film was formed (blank 2).

TABLE 1

Applied amount: Left half: mg/m$^2$, Right half: mmol/m$^2$

| | Organic acid | | Haze inhibitor | | | Haze ratio (%) | | | | | |
|---|---|---|---|---|---|---|---|---|---|---|---|
| | Type | Applied amount | Type | Applied amount | Functional group ratio | Initial state | 7th day | 14th day | 21th day | 30th day | Occurrence of weathering |
| Blank 1 | — | 0 | — | 0 | — | 0.1 | | | | | Occurred |
| Comparative Example 1 | Adipic acid | 50/0.34 | — | 0 | 0 | 20 | 20 | 20 | 20 | 20 | No occurrence |
| Example 1 | Adipic acid | 50/0.34 | VP/VAc | 50/0.47 | 0.7 | 1 | 1 | 1 | 1 | 1 | No occurrence |
| Example 2 | Adipic acid | 100/0.68 | VP/VAc | 100/0.94 | 0.7 | 1 | 1 | 1 | 1 | 1 | No occurrence |
| Example 3 | Adipic acid | 50/0.34 | VP/VC | 50/0.41 | 0.6 | 1 | 1 | 1 | 1 | 1 | No occurrence |
| Example 4 | Adipic acid | 50/0.34 | VP/VI | 50/0.50 | 0.7 | 1 | 1 | 1 | 1 | 1 | No occurrence |
| Example 5 | Adipic acid | 50/0.34 | VP/VAc | 100/0.94 | 1.4 | 1 | 1 | 1 | 1 | 1 | No occurrence |
| Example 6 | Adipic acid | 50/0.34 | VP/VAc | 35/0.33 | 0.5 | 1 | 1 | 1 | 3 | 3 | No occurrence |
| Example 7 | Adipic acid | 50/0.34 | PVP(450K) | 50/0.45 | 0.7 | 1 | 1 | 3 | 3 | 5 | No occurrence |
| Example 8 | Adipic acid | 50/0.34 | PVP(1400K) | 50/0.45 | 0.7 | 1 | 1 | 3 | 3 | 5 | No occurrence |
| Example 9 | Adipic acid | 50/0.34 | PEO | 50/1.14 | 1.7 | 1 | 1 | 3 | 3 | 5 | No occurrence |
| Example 10 | Itaconic acid | 50/0.38 | VP/VAc | 50/0.47 | 0.6 | 1 | 1 | 1 | 1 | 1 | No occurrence |

TABLE 1-continued

| | Organic acid | | Haze inhibitor | | | Haze ratio (%) | | | | | |
|---|---|---|---|---|---|---|---|---|---|---|---|
| | Type | Applied amount | Type | Applied amount | Functional group ratio | Initial state | 7th day | 14th day | 21th day | 30th day | Occurrence of weathering |
| Example 11 | Itaconic acid | 100/0.77 | VP/VAc | 100/0.94 | 0.6 | 1 | 1 | 1 | 1 | 1 | No occurrence |
| Example 12 | Tartaric acid | 50/0.33 | VP/VAc | 50/0.47 | 0.7 | 1 | 1 | 1 | 1 | 1 | No occurrence |

Blank 1: Glass sheet whose both surfaces were uncovered,
VP: Vinylpyrrolidone,
VAc: Vinyl acetate,
VC: Vinylcaprolactam,
VI: Vinylimidazole,
PVP: Polyvinylpyrrolidone (parenthesized value = molecular weight),
PEO: Polyethylene oxide,
Functional group ratio = Total number of functional groups of inhibitor/Total number of functional groups of organic acid,
The applied amount in mole of the haze inhibitor is indicated by the number of moles of the functional groups.

TABLE 2

| | Organic acid | | Haze inhibitor | | | Haze ratio (%) | | | | | |
|---|---|---|---|---|---|---|---|---|---|---|---|
| | Type | Applied amount | Type | Applied amount | Functional group ratio | Initial state | 7th day | 14th day | 21th day | 30th day | Occurrence of weathering |
| Blank 2 | — | 0 | — | 0 | — | 8 | 8 | 8 | 8 | 8 | No occurrence |
| Comparative Example 2 | Adipic acid | 30/0.21 | — | 0 | 0 | 20 | 20 | 20 | 20 | 20 | No occurrence |
| Comparative Example 3 | Adipic acid | 50/0.34 | — | 0 | 0 | 30 | 30 | 30 | 30 | 30 | No occurrence |
| Example 13 | Adipic acid | 30/0.21 | STPP | 30/0.08 | 1.0 | 8 | 8 | 8 | 8 | 8 | No occurrence |
| Example 14 | Adipic acid | 30/0.21 | STPP | 20/0.05 | 0.7 | 10 | 10 | 10 | 10 | 10 | No occurrence |
| Example 15 | Adipic acid | 50/0.34 | STPP | 30/0.08 | 0.6 | 10 | 10 | 10 | 10 | 10 | No occurrence |
| Example 16 | Itaconic acid | 30/0.23 | STPP | 30/0.08 | 0.9 | 8 | 8 | 8 | 8 | 8 | No occurrence |
| Example 17 | Tartaric acid | 30/0.20 | STPP | 30/0.08 | 1.0 | 8 | 8 | 8 | 8 | 8 | No occurrence |
| Example 18 | Adipic acid | 30/0.21 | VP/VAc | 30/0.28 | 0.7 | 10 | 10 | 10 | 10 | 10 | No occurrence |
| Example 19 | Adipic acid | 30/0.21 | PVP (1200K) | 30/0.27 | 0.6 | 10 | 10 | 12 | 12 | 14 | No occurrence |

Blank 2: Glass sheet on which only a tin oxide film was formed,
STPP: Sodium tripolyphosphate,
VP: Vinylpyrrolidone,
VAc: vinyl acetate,
PVP: Polyvinylpyrrolidone (parenthesized value = molecular weight)
Functional group ratio = Total number of functional groups of inhibitor/Total number of functional groups of organic acid,
The applied amount in mole of the haze inhibitor is indicated by the number of moles of the functional groups.

The invention claimed is:

1. A coated glass sheet comprising a glass sheet and a coating formed on the glass sheet, the coating containing an organic acid and a water-soluble copolymer, wherein the organic acid is a carboxylic acid having two or more carboxyl groups, and the water-soluble copolymer contains a unit represented by the following formula (1):

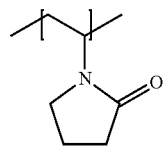

(1)

and has a molecular weight of 30,000 or more.

2. The coated glass sheet according to claim 1, wherein the water-soluble copolymer further contains at least one selected from a vinyl ester unit and a unit represented by the following formula (2):

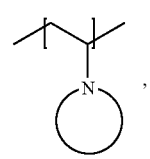

(2)

where a nitrogen-containing ring in the formula (2) is a five-membered ring other than a nitrogen-containing ring shown in the formula (1), a six-membered ring, or a seven-membered ring.

3. The coated glass sheet according to claim 1, wherein the coating is formed directly on a surface of the glass sheet.

4. The coated glass sheet according to claim 3, having a haze value of 5% or less.

5. The coated glass sheet according to claim 1, further comprising a thin film formed on a surface of the glass sheet, the thin film containing an inorganic substance and a mass content of the inorganic substance being higher than a mass content of an organic substance contained in the thin film, wherein the coating is formed on a surface of the thin film.

6. The coated glass sheet according to claim 5, wherein the coating further contains a polyphosphoric acid salt.

7. The coated glass sheet according to claim 5, having a haze value A that differs by less than 8% from a haze value B, the haze value B being measured with the glass sheet with the thin film but without the coating.

8. The coated glass sheet according to claim 1, wherein the organic acid is a carboxylic acid having two carboxyl groups.

9. A coated glass sheet comprising a glass sheet and a coating formed on the glass sheet, the coating containing an organic acid and a water-soluble copolymer, wherein the organic acid includes at least one selected from the group consisting of adipic acid, itaconic acid, tartaric acid, malic acid, maleic acid and lactic acid, and the water-soluble copolymer contains a unit represented by the following formula (1):

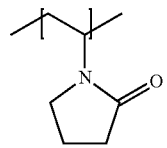

(1)

and has a molecular weight of 30,000 or more.

10. The coated glass sheet according to claim 9, wherein the water-soluble copolymer further contains at least one selected from a vinyl ester unit and a unit represented by the following formula (2):

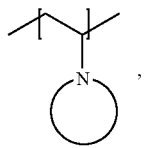

(2)

where a nitrogen-containing ring in the formula (2) is a five-membered ring other than a nitrogen-containing ring shown in the formula (1), a six-membered ring, or a seven-membered ring.

11. The coated glass sheet according to claim 9, wherein the coating is formed directly on a surface of the glass sheet.

12. The coated glass sheet according to claim 11, having a haze value of 5% or less.

13. The coated glass sheet according to claim 9, further comprising a thin film formed on a surface of the glass sheet, the thin film containing an inorganic substance and a mass content of the inorganic substance being higher than a mass content of an organic substance contained in the thin film, wherein the coating is formed on a surface of the thin film.

14. The coated glass sheet according to claim 13, wherein the coating further contains a polyphosphoric acid salt.

15. The coated glass sheet according to claim 13, having a haze value A that differs by less than 8% from a haze value B, where the haze value B is measured with the glass sheet with the thin film but without the coating.

16. A method for producing the coated glass sheet of claim 1, wherein the method comprises:
    cutting a glass ribbon to form a plurality of glass sheets in a glass sheet production line; and
    applying a solution onto the glass ribbon or the plurality of glass sheets in the glass sheet production line, the solution containing an organic acid and a water-soluble copolymer, the organic acid being a carboxylic acid having two or more carboxyl groups, and the water-soluble copolymer containing a unit represented by the following formula (1):

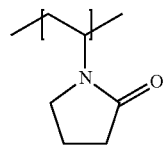

(1)

and having a molecular weight of 30,000 or more.

17. The method for producing a coated glass sheet according to claim 16, wherein the solution is applied directly onto a surface of the glass ribbon or a surface of each of the plurality of glass sheets.

18. The method for producing a coated glass sheet according to claim 16, further comprising forming a thin film containing an inorganic substance on a surface of the glass ribbon, a mass content of the inorganic substance being higher than a mass content of an organic substance contained in the thin film,
    wherein the solution is applied onto a surface of the thin film formed on the surface of the glass ribbon or formed on a surface of each of the plurality of glass sheets.

* * * * *